US010409259B2

(12) United States Patent
Shinoda et al.

(10) Patent No.: US 10,409,259 B2
(45) Date of Patent: Sep. 10, 2019

(54) SERVOMOTOR CONTROL DEVICE

(71) Applicant: FANUC CORPORATION, Minamitsuru-gun, Yamanashi (JP)

(72) Inventors: Shougo Shinoda, Yamanashi (JP); Satoshi Ikai, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/996,703

(22) Filed: Jun. 4, 2018

(65) Prior Publication Data
US 2018/0348732 A1 Dec. 6, 2018

(30) Foreign Application Priority Data

Jun. 6, 2017 (JP) ................. 2017-111903

(51) Int. Cl.
*G05B 19/404* (2006.01)
*G05B 19/406* (2006.01)

(52) U.S. Cl.
CPC .. *G05B 19/404* (2013.01); *G05B 2219/41122* (2013.01); *G05B 2219/49166* (2013.01)

(58) Field of Classification Search
USPC ....... 318/264–266, 272, 275, 277, 282, 286, 318/466–469, 626
See application file for complete search history.

(56) References Cited

U.S. PATENT DOCUMENTS 5,418,440 A * 5/1995 Sakaguchi ......... G05B 19/4061
318/560
5,691,616 A * 11/1997 Iwashita ............. G05B 19/232
318/568.22
(Continued)

FOREIGN PATENT DOCUMENTS

JP          2-30522       7/1990
JP         11-345025     12/1999
(Continued)

OTHER PUBLICATIONS

Notification of Reasons for Refusal dated Jan. 29, 2019 in corresponding Japanese Patent Application No. 2017-111903.

*Primary Examiner* — Bentsu Ro
(74) *Attorney, Agent, or Firm* — Wenderoth, Lind & Ponack, L.L.P.

(57) ABSTRACT

A servomotor control device includes a servomotor, driven body, connection mechanism, first position detection section, second position detection section, and motor control unit. The motor control unit has: a dual position control section that performs semi-closed FB control based on a high-frequency component of a first deviation between a position command value and the position of the servomotor detected by the first position detection section, and full-closed FB control based on a low-frequency component of a second deviation between the position command value and the position of the driven body detected by the second position detection section; an acquisition section that acquires a magnitude of rigidity of the connection mechanism; and a varying section that varies a proportion of the semi-closed FB control to full-closed FB control in the dual position control section, in response to the acquired magnitude of rigidity of the connection mechanism.

12 Claims, 8 Drawing Sheets

(56) References Cited

U.S. PATENT DOCUMENTS

| | | | | |
|---|---|---|---|---|
| 6,822,415 B1* | 11/2004 | Komiya | ............... | H02P 29/50 318/560 |
| 2014/0203752 A1* | 7/2014 | Yamamoto | ............ | G05B 5/00 318/620 |
| 2017/0212497 A1* | 7/2017 | Kumazawa | ........... | G05B 19/05 |
| 2018/0157236 A1* | 6/2018 | Shinoda | ............. | G05B 19/404 |

FOREIGN PATENT DOCUMENTS

| | | |
|---|---|---|
| JP | 2002-297241 | 10/2002 |
| JP | 2010-271854 | 12/2010 |
| JP | 2012-168926 | 9/2012 |
| JP | 2016-034224 | 3/2016 |

* cited by examiner

SERVOMOTOR CONTROL DEVICE

This application is based on and claims the benefit of priority from Japanese Patent Application No. 2017-111903, filed on 6 Jun. 2017, the content of which is incorporated herein by reference.

BACKGROUND OF THE INVENTION

Field of the Invention

The present invention relates to a servomotor control device that performs dual position feedback control of semi-closed feedback control based on the position of the servomotor and full-closed feedback control based on the position of a driven body.

Related Art

For example, a servomotor control device has been known that controls the position of a workpiece (work) using servomotors in a machine tool or the like. The servomotor control device mounts the workpiece on a table (driven body) (also referred to as mobile body), and causes the table to move by a servomotor via the connection mechanism. The connection mechanism has a coupling connected to a servomotor, a ball screw that is fixed to the coupling, and a nut that is threaded with the ball screw, and connected to the table. When causing the ball screw to rotate by way of the servomotor, the nut threaded to the ball screw is driven in the axial direction of the ball screw, and the table connected to the nut is thereby moved.

As control modes by the servomotor control device, there is semi-closed feedback control, full-closed feedback control, and dual position feedback control. The semi-closed feedback control performs feedback control based on the position of the servomotor. The full-closed feedback control performs feedback control based on the position of the driven body. The dual position feedback control performs feedback control based on both the position of the servomotor and the position of the driven body (for example, refer to Patent Documents 1 to 3).

Patent Document 1: Japanese Examined Patent Application Publication No. H02-30522

Patent Document 2: Japanese Unexamined Patent Application, Publication No. 2002-297241

Patent Document 3: Japanese Unexamined Patent Application, Publication No. 2010-271854

SUMMARY OF THE INVENTION

However, vibrations may occur in a machine tool depending on aging of the machine tool. For example, the resonance frequency inherent to the machine tool may decline, due to causes of aging degradation (decline) of rigidity of the connection mechanism (particularly the coupling and ball screw), or aging degradation of any other portions of the machine tool, whereby low-frequency vibrations may occur in the machine tool. When low-frequency vibrations occur in the machine tool, the machining precision of the machine tool declines.

The present invention has an object of providing a servomotor control device that suppresses the occurrence of vibrations in a machine tool caused by aging of the machine tool (for example, aging degradation of the rigidity of the connection mechanism).

(1) A servomotor control device (for example, the servomotor control device 1, 1A, 1B, 1C described later) according to the present invention includes: a servomotor (for example, the servomotor 50 described later); a driven body (for example, the table 70 described later) driven by the servomotor; a connection mechanism (for example, the connection mechanism 60 described later) that connects the servomotor and the driven body to transmit power of the servomotor to the driven body; a first position detection section (for example, the encoder 40 described later) that detects a position of the servomotor; a second position detection section (for example, the scale 80 described later) that detects a position of the driven body; and a motor control unit (for example, the motor control unit 10, 10A, 10B, 10C described later) that controls the servomotor, in which the motor control unit includes: a dual position control section (for example, the dual position control section 30A, 30B described later) that performs semi-closed feedback control based on a high-frequency component of a first deviation between a position command value for driving control of the servomotor and the position of the servomotor detected by the first position detection section, and full-closed feedback control based on a low-frequency component of a second deviation between the position command value and the position of the driven body detected by the second position detection section; an acquisition section (for example, the force estimation section 20, the rigidity estimation section 22, the acquisition section 20C described later) that acquires a magnitude of rigidity of the connection mechanism, or a magnitude of resonance frequency of the servomotor control device; and a varying section (for example, the control proportion varying section 35A, 35B described later) that causes a proportion of the semi-closed feedback control to the full-closed feedback control in the dual position control section to vary in response to the magnitude of or variation in rigidity of the connection mechanism acquired by the acquisition section, or the magnitude of or variation in resonance frequency of the servomotor control device acquired by the acquisition section.

(2) In the servomotor control device described in (1), the varying section may cause a proportion of the semi-closed feedback control to increase and a proportion of the full-closed feedback control to decrease, in response to a decline in the rigidity of the connection mechanism, or a decline in the resonance frequency of the servomotor control device.

(3) In the servomotor control device described in (1) or (2), the acquisition section may have: a force estimation section (for example, the force estimation section 20 described later) that estimates a drive force acting on the driven body at a connection part between the connection mechanism and the driven body; and a rigidity estimation section (for example, the rigidity estimation section 22 described later) that estimates a magnitude of rigidity of the connection mechanism, based on the position of the servomotor detected by the first position detection section, the position of the driven body detected by the second position detection section, and the drive force estimated by the force estimation section.

(4) In the servomotor control device described in (1) or (2), the acquisition section may acquire a frequency characteristic of a transfer characteristic of a feedback control loop of the servomotor control device, and acquires a magnitude of resonance frequency of the servomotor control device from the frequency characteristic of the transfer characteristic thus acquired.

(5) In the servomotor control device described in (1) or (2), the motor control unit may further include a storage section (for example, the storage section 24 described later) that stores a plurality of magnitudes of rigidity, or a plurality of magnitudes of resonance frequency, acquired by the acquisition section at every predetermined time interval or indefinite time intervals, and the varying section may calculate variation in the rigidity of the connection mechanism or variation in the resonance frequency of the servomotor control device, based on a plurality of magnitudes of rigidity or a plurality of magnitudes of resonance frequency stored in the storage section.

(6) In the servomotor control device described in any one of (1) to (5), the dual position control section may further include: a first subtraction part (for example, the subtracter 31A described later) that obtains a first deviation between the position command value and the position of the servomotor detected by the first position detection section; a second subtraction part (for example, the subtracter 31B described later) that obtains a second deviation between the position command value and the position of the driven body detected by the second position detection section; a high-pass filter (for example, the high-pass filter 32A described later) that inputs the first deviation from the first subtraction part; a low-pass filter (for example, the low-pass filter 32B described later) that inputs the second deviation from the second subtraction part; and an addition part (for example, the adder 33 described later) that adds a high-frequency component of the first deviation outputted from the high-pass filter and a low-frequency component of the second deviation outputted from the low-pass filter, and the varying section may cause the cut-off frequency of the high-pass filter and the cut-off frequency of the low-pass filter to vary in response to the magnitude of or variation in rigidity of the connection mechanism, or the magnitude of or variation in resonance frequency of the servomotor control device.

(7) In the servomotor control device described in (6), the varying section may cause the cut-off frequency of the high-pass filter and cut-off frequency of the low-pass filter to decline, in response to a decline in the rigidity of the connection mechanism, or a decline in the resonance frequency of the servomotor control device.

(8) In the servomotor control device described in any one of (1) to (7), the varying section may set the cut-off frequency of the high-pass filter and the cut-off frequency of the low-pass filter to be the same.

(9) In the servomotor control device described in any one of (1) to (5), the dual position control section may further include: a first subtraction part (for example, the subtracter 31A described later) that obtains a first deviation between the position command value and the position of the servomotor detected by the first position detection section; a second subtraction part (for example, the subtracter 31B described later) that obtains a second deviation between the position command value and the position of the driven body detected by the second position detection section; a third subtraction part (for example, the subtracter 31C described later) that obtains a third deviation arrived at by subtracting the first deviation of the first subtraction part from the second deviation of the second subtraction part; a low-pass filter (for example, the low-pass filter 32B described later) that inputs the third deviation from the third subtraction part; and an addition part (for example, the adder 33 described later) that adds a high-frequency component of the first deviation and a low-frequency component of the second deviation, by adding the first deviation from the first subtraction part and a low-frequency component of the third deviation outputted from the low-pass filter, and the varying section may cause the cut-off frequency of the low-pass filter to vary in response to the magnitude of or variation in rigidity of the connection mechanism, or the magnitude of or variation in resonance frequency of the servomotor control device.

(10) In the servomotor control device described in (9), the varying section may cause the cut-off frequency of the low-pass filter to decline in response to a decline in the rigidity of the connection mechanism, or a decline in the resonance frequency of the servomotor control device.

(11) In the servomotor control device described in any one of (1) to (5), the dual position control section may further include: a first subtraction part (for example, the subtracter 31A described later) that obtains a first deviation between the position command value and the position of the servomotor detected by the first position detection section; a second subtraction part (for example, the subtracter 31B described later) that obtains a second deviation between the position command value and the position of the driven body detected by the second position detection section; a third subtraction part (for example, the subtracter 31C described later) that obtains a third deviation arrived at by subtracting the second deviation of the second subtraction part from the first deviation of the first subtraction part; a high-pass filter (for example, the high-pass filter 32A described later) that inputs the third deviation from the third subtraction part; and an addition part (for example, the adder 33 described later) that adds a high-frequency component of the first deviation and a low-frequency component of the second deviation, by adding the a high-frequency component of the third deviation outputted from the high-pass filter and the second deviation from the second subtraction part, and the varying section may cause the cut-off frequency of the high-pass filter to vary in response to the magnitude of or variation in rigidity of the connection mechanism, or the magnitude of or variation in resonance frequency of the servomotor control device.

(12) In the servomotor control device described in (11), the varying section may cause the cut-off frequency of the high-pass filter to decline in response to a decline in the rigidity of the connection mechanism, or a decline in the resonance frequency of the servomotor control device.

According to the present invention, it is possible to provide a servomotor control device which suppresses the occurrence of vibration in a machine tool caused by aging of the machine tool (for example, aging degradation of rigidity of the connection mechanism).

DETAILED DESCRIPTION OF THE INVENTION

Hereinafter, examples of embodiments of the present invention will be explained by referencing the attached drawings. It should be noted that the same reference symbols shall be attached to the same or corresponding portions in the respective drawings.

Figure 1:
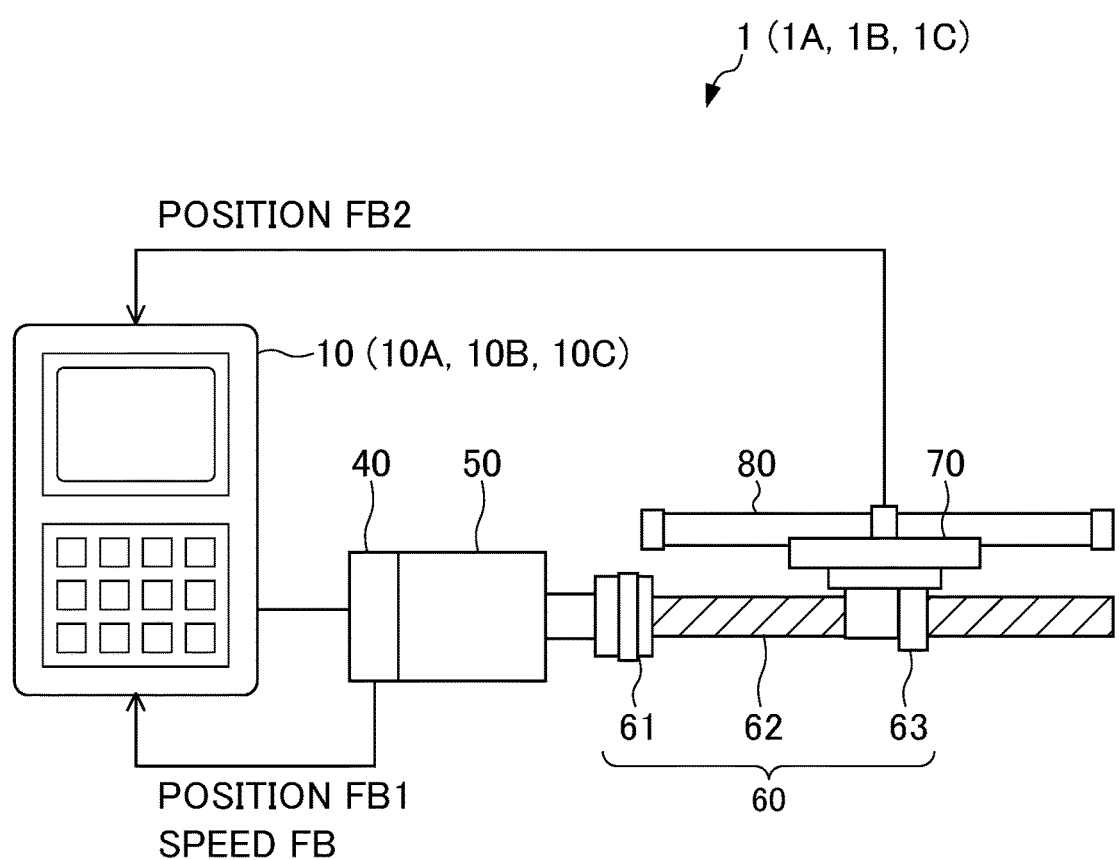
FIG. 1 is a view showing an example of the structure of a servomotor control device according to an embodiment of the present invention.

FIG. 1 is a view showing an example of the configuration of a servomotor control device according to an embodiment of the present invention. As shown in FIG. 1, a servomotor control device 1 includes a motor control unit 10, a servomotor 50, an encoder (first position detection section) 40, a connection mechanism 60, a table (driven body) 70, and a scale (second position detection section) 80.

The servomotor control device 1 moves the table 70 by the servomotor 50 via the connection mechanism 60, and machines a workpiece (work) mounted on the table 70. The connection mechanism 60 has a coupling 61 which is connected to the servomotor 50, and a ball screw 62 which is fixed to the coupling 61, and a nut 63 is threaded to the ball screw 62. The nut 63 threaded with the ball screw 62 is moved in the axial direction of the ball screw 62 by the rotational driving of the servomotor 50, whereby the table 70 connected to the nut 63 is moved.

The rotation angle position of the servomotor 50 is detected by the encoder 40 provided to the servomotor 50, and the detected rotational position (rotation amount) is used as first position feedback (hereinafter referred to as position FB1). Herein, since the rotation angle position of the servomotor 50 and the position of the table 70 are in a corresponding relationship, the rotational position detected by the encoder 40, i.e. position FB1 value, indicates the position of the table 70. It should be noted that the encoder 40 can detect the rotation speed, and the detected speed is applicable as speed feedback (hereinafter referred to as speed FB).

In addition, the position of the table 70 is detected by the scale 80 provided to the table 70, and the detected position is used as a second position feedback (hereinafter referred to as position FB2).

The motor control unit 10 controls the servomotor 50 based on the position command value in accordance with a machining program, the position FB1 value or position FB2 value, and speed FB value. More specifically, the motor control unit 10 performs dual position feedback control which performs semi-closed feedback control based on deviation between a position command value and position FB1 value (first deviation), and full-closed feedback control based on deviation between the position command value and position FB2 value (second deviation). The details of the motor control unit 10 will be described later.

Hereinafter, servomotor control devices 1A, 1B and 1C of three embodiments will be explained in detail as the servomotor control device 1. The servomotor control devices 1A, 1B and 1C of first to third embodiments differ in the point of respectively including motor control units 10A, 10B and 10C as the motor control unit 10 in the aforementioned servomotor control device 1. Other configurations of the servomotor control devices 1A, 1B and 1C of the first to third embodiments are the same as the aforementioned servomotor control device 1.

(Servomotor Control Device of First Embodiment)

In FIG. 1, the servomotor control device 1A according to the first embodiment includes the motor control unit 10A as the aforementioned motor control unit 10.

Figure 2:
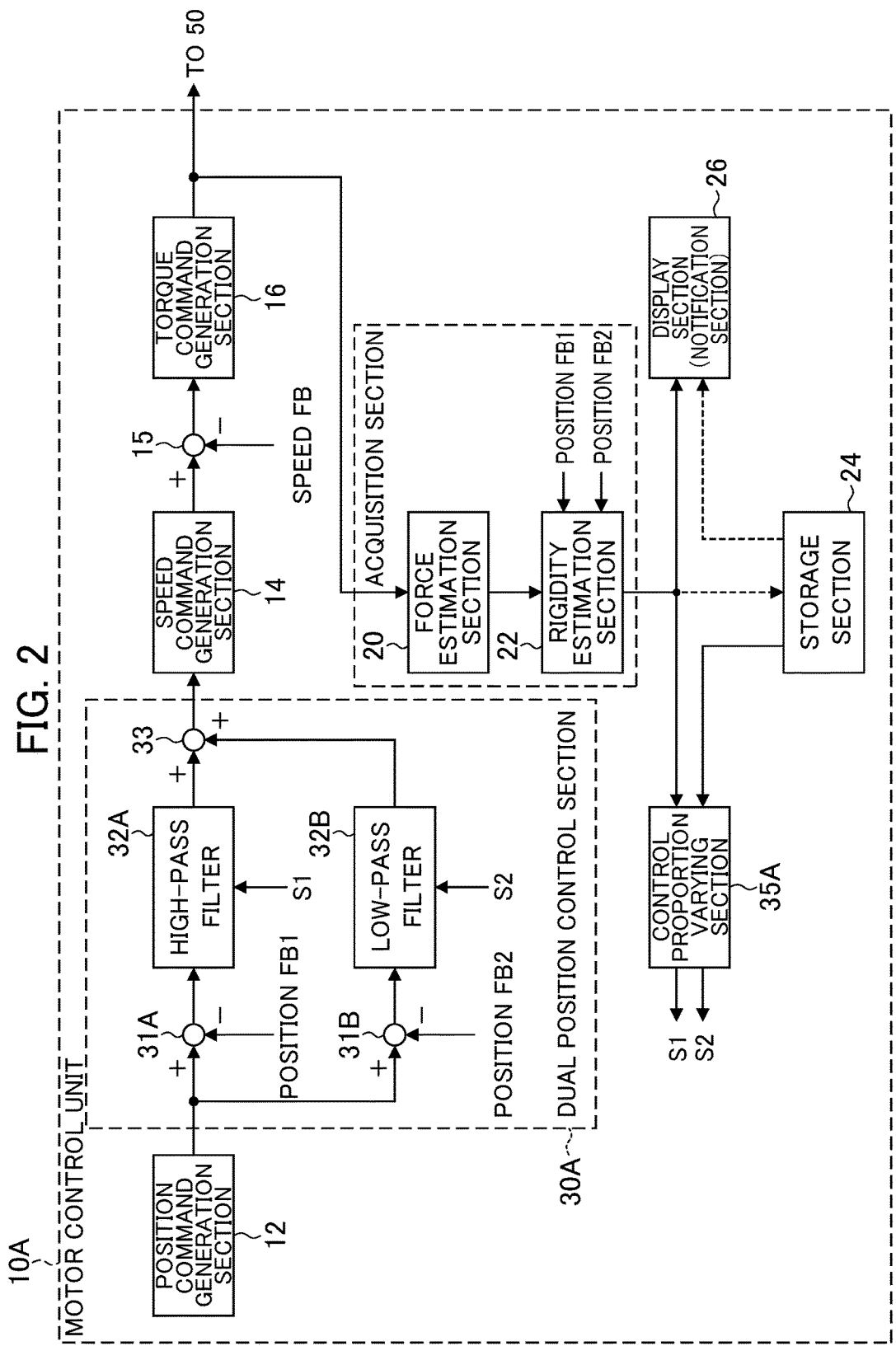
FIG. 2 is a view showing the structure of a motor control unit in the servomotor control device according to a first embodiment.

FIG. 2 is a view showing the configuration of the motor control unit 10A in the servomotor control device 1A according to the first embodiment. As shown in FIG. 2, the motor control unit 10A includes a position command generation section 12, dual position control section 30A, speed command generation section 14, subtracter 15, torque command generation section 16, force estimation section (acquisition section) 20, rigidity estimation section (acquisition section) 22, storage section 24, display section (notification section) 26, and control proportion varying section (varying section) 35A.

The position command generation section 12 creates a position command value for the servomotor 50 in accordance with a program or instruction inputted from a higher-order control device or external input device, etc. (not illustrated).

The dual position control section 30A performs semi-closed feedback control based on a high-frequency component of the first deviation between the position command value created by the position command generation section 12 and the position FB1 value from the encoder 40; and full-closed feedback control based on the low-frequency component of the second deviation between the position command value and the position FB2 value from the scale 80. The dual position control section 30A includes subtracters 31A, 31B, a high-pass filter 32A, a low-pass filter 32B and an adder 33.

The subtracter (first subtraction part) 31A obtains the first deviation between the position command value created by the position command generation section 12 and the position FB1 value from the encoder 40. The high-pass filter 32A allows the high-frequency component of the first deviation obtained by the subtracter 31A to pass, and cuts the low-frequency component. The cut-off frequency of the high-pass filter 32A is varied in response to a control signal S1 from the control proportion varying section 35A.

The subtracter (second subtraction part) 31B obtains the second deviation between the position command value created by the position command generation section 12 and the position FB2 value from the scale 80. The low-pass filter 32B allows the low-frequency component of the second deviation obtained from the subtracter 31B to pass, and cuts the high-frequency component. The cut-off frequency of the low-pass filter 32B is varied in response to a control signal S2 from the control proportion varying section 35A.

The adder 33 adds the high-frequency component of the first deviation having passed through the high-pass filter 32A and the low-frequency component of the second deviation having passed through the low-pass filter 32B, and sends to the speed command generation section 14.

Herein, the following relationship holds true between the cut-off frequency f[Hz] of the high-pass filter 32A and low-pass filter 32B and the time constant τ[s].

$$f = 1/(2\pi \times \tau)$$

Adjusting the cut-off frequencies is thereby synonymous with adjusting the time constant.

When defining the first deviation as E1, and the second deviation as E2, the output EH of the high-pass filter 32A and the output EL of the low-pass filter 32B are represented as in the next formulas.

$$EH=\tau s/(1+\tau s) \times E1$$

$$EL=1/(1+\tau s) \times E2$$

s: angular frequency

The deviation added by the adder 33 is thereby expressed as in the next formula.

$$\text{Deviation}=\tau s/(1+\tau s) \times E1 + 1/(1+\tau s) \times E2 \qquad (1)$$

At time constant $\tau=\infty$, i.e. cut-off frequency f=0, according to Formula (1) above, the deviation becomes E1, and the semi-closed feedback control becomes dominant. On the other hand, at time constant $\tau=0$, i.e. cut-off frequency f=$\infty$, the deviation becomes E2, and the full-closed feedback control becomes dominant. In addition, by controlling the magnitude of the time constant $\tau$, i.e. magnitude of the cut-off frequency f, it is possible to vary the ratio of semi-closed feedback control to full-closed feedback control.

The speed command generation section 14 creates a speed command value for the servomotor 50 based on the deviation obtained by the adder 33 of the dual position control section 30A. The subtracter 15 obtains a difference between the speed command value created by the speed command generation section 14 and the speed FB value from the encoder 40. The torque command generation section 16 creates a torque command value for the servomotor 50 based on the finite difference obtained by the subtracter 15, and supplies to the servomotor 50.

The force estimation section 20 estimates a drive torque (drive force) acting on the table 70 at a connection part between the table 70 (nut 63) and connection mechanism 60, based on the torque command value from the torque command generation section 16. It should be noted that the force estimation section 20 may estimate the drive torque based on the drive electric current of the servomotor 50, i.e. actual electric current (actual torque), detected using a current detector.

The rigidity estimation section 22 estimates the magnitude of rigidity of the connection mechanism 60, based on the drive torque estimated by the force estimation section 20, the position FB1 value from the encoder 40 (position of the servomotor 50 detected by the encoder 40, i.e. position of the table 70), and the position FB2 value from the scale 80 (position of the table 70 detected by the scale 80). More specifically, the rigidity estimation section 22 estimates the magnitude of rigidity of the connection mechanism 60, according to Formula (2) below, based on the drive torque value estimated, and the difference between the position FB1 value and position FB2 value.

Magnitude of rigidity=drive torque value/difference between position FB1 value and position FB2 value $\qquad (2)$ The details of the estimation method for the magnitude of rigidity of the connection mechanism 60 will be described later.

The storage section 24 stores the magnitude of rigidity of the connection mechanism 60 estimated by the rigidity estimation section 22, at every predetermined time interval or indefinite time intervals. In addition, the storage section 24 stores a function that defines as input the magnitude of rigidity of the connection mechanism 60, and defines as output the control signals S1, S2 according to the inputted magnitude of rigidity, which change the cut-off frequency of the high-pass filter 32A and the cut-off frequency of the low-pass filter 32B. For example, the storage section 24 stores, as the function, a table in which the magnitude of rigidity and the control signals S1, S2 are associated. For example, in the table, control signals S1, S2 are set such that lower the cut-off frequency as the rigidity declines. The storage section 24 is rewritable memory such as EEPROM, for example.

The control proportion varying section 35A varies the proportion of semi-closed feedback control to full-closed feedback control of the dual position control unit 30, according to the magnitude of rigidity of the connection mechanism 60 estimated by the rigidity estimation section 22. More specifically, the control proportion varying section 35A causes the proportion of semi-closed feedback control to increase, and the proportion of full-closed feedback control to decrease, in response to a decline in the estimated rigidity of the connection mechanism 60.

More specifically, the control proportion varying section 35A generates the control signals S1, S2 corresponding to the magnitude of rigidity of the connection mechanism 60 estimated by the rigidity estimation section 22, based on the function stored in the storage section 24 (for example, the table), and sends to the high-pass filter 32A and low-pass filter 32B, respectively. The control proportion varying section 35A thereby causes the cut-off frequencies of the high-pass filter 32A and low-pass filter 32B to vary. More specifically, the control proportion varying section 35A causes the cut-off frequencies of the high-pass filter 32A and low-pass filter 32B to decline in response to a decline in the estimated rigidity of the connection mechanism 60.

The control signals S1, S2 may be the same or may differ. In other words, the cut-off frequency of the high-pass filter 32A and the cut-off frequency of the low-pass filter 32B may be the same or may differ. In the case of the cut-off frequencies of these filters being the same, it is possible to make the frequency characteristic of deviation added by the adder 33 to be a characteristic close to flat over the entire region, when the values of E1 and E2 are close values. It should be noted that, in the case of the cut-off frequencies of these filters not being the same, since the frequency components between cut-off frequencies of these filters are attenuated or amplified, a certain specific frequency component of these may be amplified or attenuated.

The display section 26 displays information (for example, numerical values, text, images, etc.) indicating the magnitude of rigidity estimated by the rigidity estimation section 22. The display section 26 is a display device such as a liquid crystal display, for example.

The motor control unit 10A (and motor control units 10B, 10C described later) is configured by arithmetic processors such as a DSP (Digital Signal Processor), and FPGA (Field-Programmable Gate Array), for example. The various functions (position command generation section 12, dual position control section 30A (i.e. subtracters 31A, 31B, high-pass filter 32A, low-pass filter 32B, adder 33), speed command generation section 14, subtracter 15, torque command generation section 16, force estimation section 20, rigidity estimation section 22, control proportion varying section 35A, dual position control section 30B described later (i.e. subtracter 31C), control proportion varying section 35B described later, and acquisition section 20C described later) of the motor control unit 10A (motor control units 10B, 10C) are realized by executing predetermined software (programs) saved in a storage unit (for example, the storage section 24). The various functions of the motor control unit 10A (motor control unit 10B, 10C) may be realized by the cooperation of hardware and software, or may be realized by only hardware (electronic circuits).

Figure 3:
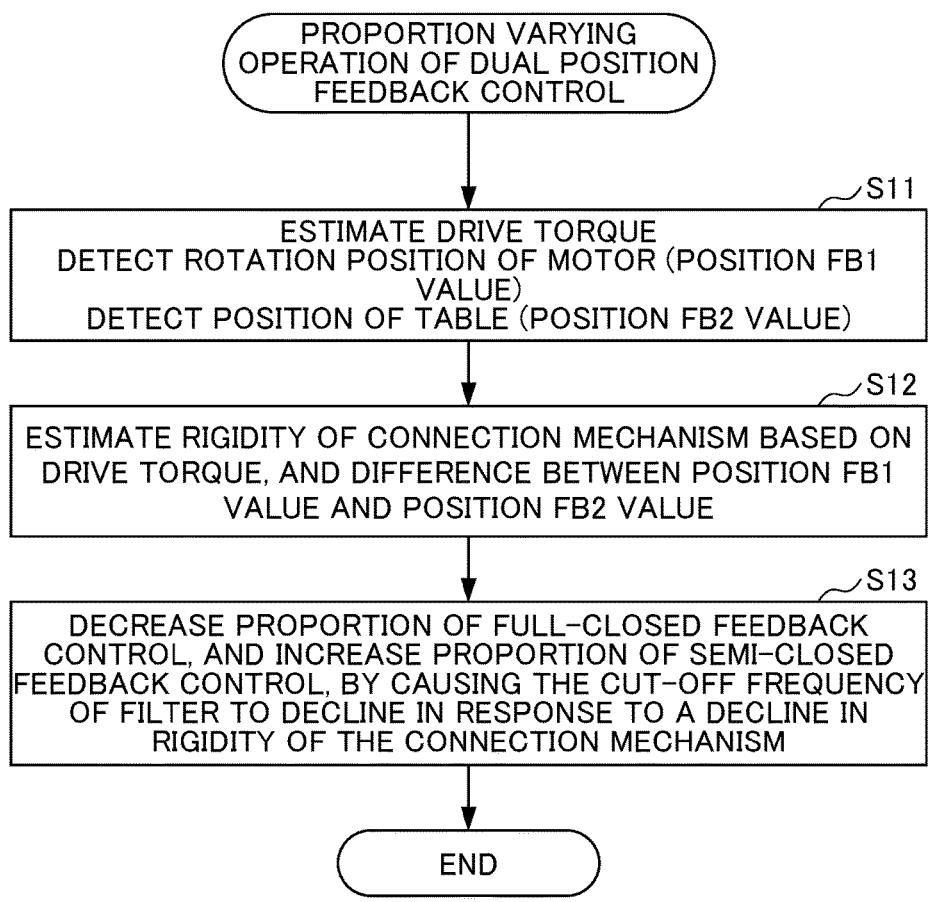
FIG. 3 is a flowchart showing proportion change operation of dual position feedback control by the servomotor control device according to the first embodiment.

Next, proportion varying operation of the dual position feedback control by the servomotor control device 1A of the first embodiment will be explained by referencing FIG. 3. FIG. 3 is a flowchart showing the proportion varying operation of dual position feedback control by the servomotor control device 1A of the first embodiment.

First, in Step S11, the motor control unit 10A supplies a torque command according to the position command (movement command) to the servomotor 50 to cause the servomotor 50 to rotate. At this time, the force estimation section 20 estimates the drive torque acting on the table 70 at the connection part between the table 70 (nut 63) and connection mechanism 60, based on the torque command from the torque command generation section 16. In addition, the rotation position of the servomotor 50 (rotation position corresponding to position of table 70) is detected by the encoder 40 of the servomotor 50, and sent to the motor control unit 10A as the position FB1 value. In addition, the position of the table 70 is detected by the scale 80 of the table 70, and sent to the motor control unit 10A as the position FB2 value.

Next, in Step S12, the rigidity estimation section 22 estimates the magnitude of rigidity of the connection mechanism 60 based on the drive torque value estimated by the force estimation section 20, and the difference between the position FB1 value from the encoder 40 and the position FB2 value from the scale 80.

A difference between the rotation position of the servomotor 50 detected by the encoder 40 (i.e. rotation position corresponding to position of table 70) (position FB1 value) and the position of the table 70 detected by the scale 80 (position FB2 value) is produced due to elastic deformation such as twisting of the connection mechanism (ball screw, coupling, etc.). Then, the rigidity is expressed by the ratio of deformation amount (elastic deformation amount) relative to the force applied (drive torque). The rigidity estimation section 22 thereby estimates the magnitude of rigidity according to Formula (2) below.

Magnitude of rigidity=drive torque value/elastic deformation amount=drive torque value/difference between position FB1 value and position FB2 value   (2)

It should be noted that the rigidity estimated by the rigidity estimation section 22 in the present embodiment includes elastic deformation and the influence of play.

Herein, the rigidity of the connection mechanism 60 ages (declines). For example, the rigidity of the ball screw 62 in the connection mechanism 60 declines due to the preloading weakening with time. Herein, when the rigidity declines, the resonance frequency of the servomotor control device (i.e. machine tool) declines, and the possibility of low-frequency vibrations being produced in the machine tool rises. If low-frequency vibrations occur in the machine tool, the machining precision of the machine tool will decline.

Therefore, in Step S13, the control proportion varying section 35A generates the control signals S1, S2 corresponding to the magnitude of rigidity of the connection mechanism 60 estimated by the rigidity estimation section 22, based on the function (e.g., table) stored in the storage section 24, and sends to the high-pass filter 32A and low-pass filter 32B of the dual position control section 30A, respectively. The control proportion varying section 35 thereby causes the cut-off frequencies of the high-pass filter 32A and low-pass filter 32B to vary. More specifically, the control proportion varying section 35A causes the cut-off frequencies of the high-pass filter 32A and low-pass filter 32B to decline in response to a decline in the estimated rigidity of the connection mechanism 60.

The proportion of the low-frequency component of the second deviation between the position command value and position FB2 value passing through the low-pass filter 32B thereby decreases, and the proportion of the high frequency component of the first deviation between the position command value and position FB1 value passing through the high-pass filter 32A increases. For this reason, the proportion of full-closed feedback control based on the low frequency component of the second deviation decreases, and the proportion of semi-closed feedback control based on the high frequency component of the first deviation increases.

Herein, with the dual position control section 30A, semi-closed feedback control including the high-pass filter 32A becomes dominant during transient operation in which high-frequency deviation is generated. On the other hand, during positioning in which low-frequency deviation is generated, full-closed feedback control including the low-pass filter 32B becomes dominant.

The semi-closed feedback control based on the first deviation between the position command value and position FB1 value has a characteristic of control being stable, due to using the position FB1 from the encoder 40 of the servomotor 50, i.e. due to the connection mechanism 60 not being included in the feedback loop. On the other hand, the full-closed feedback control based on the second deviation between the position command value and the position FB2 value has a characteristic of high positioning precision, due to using the position FB2 value from the scale 80 provided close to the table (driven body) 70.

According to the dual position control section 30A, it is thereby possible to obtain stable operation during transient operation, and possible to suppress vibration of the machine tool. On the other hand, it is possible to obtain high positioning precision during positioning.

Furthermore, since the cut-off frequency of the high-pass filter 32A and the cut-off frequency of the low-pass filter 32B are made to decline in response to a decline in rigidity of the connection mechanism 60 by the control proportion varying section 35A, the proportion of full-closed feedback control including the connection mechanism 60 decreases, and the proportion of semi-closed feedback control capable of stable operation without including the connection mechanism 60 increases. It is thereby possible to suppress the occurrence of vibration in the machine tool caused by a decline in rigidity of the connection mechanism 60, without harming the high positioning precision during positioning. For this reason, it is possible to suppress a decline in the machining precision of the machine tool caused by the occurrence of vibration in the machine tool.

It should be noted that switching from semi-closed feedback control during transient operation to full-closed feedback control during positioning becomes gentle (becomes slower) with lower cut-off frequencies of the high-pass filter 32A and low-pass filter 32B.

At this time, the display section 26 may display information indicating the magnitude of rigidity of the connection mechanism 60.

The motor control unit 10A returns to Step S11 after the elapse of a predetermined time, and repeats the aforementioned operations. It should be noted that the motor control unit 10A is not limited to after a fixed time (predetermined time) elapse set in advance, and may repeat the aforementioned operations after an irregular time elapse (at indefinite time intervals). Alternatively, the motor control unit 10A may repeat the aforementioned operations at all times, or during set specific operations (for example, during startup).

It should be noted that, in Step S12, the rigidity estimation section 22 may store the estimated magnitude of rigidity to be associated with various information such as the estimation time/date in the storage section 24. In addition, in Step S13, the control proportion varying section 35A may change the proportion of controls, based on the latest magnitude of rigidity stored in the storage section 24.

As explained above, with the servomotor control device 1A of the present embodiment, the force estimation section (acquisition section) 20 and rigidity estimation section (acquisition section) 22 estimate the magnitude of rigidity of the connection mechanism 60, and the control proportion varying section 35A, in response to a decline in the estimated rigidity of the connection mechanism 60, causes the cut-off frequency of the high-pass filter 32A and the cut-off frequency of the low-pass filter 32B in the dual position control section 30A to decline. The proportion of the full-closed feedback control based on the low-frequency component of the second deviation between the position command value and the position FB2 value thereby decreases, and the proportion of the semi-closed feedback control based on the high-frequency component of the first deviation between the position command value and the position FB1 value increases. In other words, the proportion of the full-closed feedback control including the connection mechanism 60 decreases, and the proportion of the semi-closed feedback control capable of stable operation without including the connection mechanism 60 increases. It is thereby possible to suppress the occurrence of vibration of the machine tool caused by the decline in rigidity of the connection mechanism 60, without harming the high positioning precision during positioning. For this reason, it is possible to suppress the decline in the machining precision of the machine tool caused by the occurrence of vibration of the machine tool.

In addition, with the servomotor control device 1A of the present embodiment, since the display section 26 displays information related to the magnitude of rigidity of the connection mechanism 60, it is possible for the user to confirm aging (deterioration) of rigidity of the connection mechanism 60. In addition, the user can confirm the existence of the necessity for maintenance of the connection mechanism 60.

It should be noted that, with the present embodiment, the control proportion varying section 35A varies the proportion of semi-closed feedback control to full-closed feedback control in response to the magnitude of rigidity of the connection mechanism 60; however, it is not limited thereto. For example, the control proportion varying section 35A may obtain the variation (amount of decline) in rigidity of the connection mechanism 60 based on a plurality of magnitudes of rigidity estimated at every predetermined time interval or indefinite time intervals stored in the storage section 24, and vary the proportion of semi-closed feedback control to full-closed feedback control in response to the obtained variation (amount of decline) in rigidity of the connection mechanism 60.

In addition, the display section 26 may display information indicating the obtained variation (amount of decline amount) in rigidity of the connection mechanism 60.

(Servomotor Control Device of Second Embodiment)

The first embodiment explains a dual position control section 30A made using the two filters of the high-pass filter 32A and low-pass filter 32B. The second embodiment explains a dual position control section made using one low-pass filter and a subtracter.

In FIG. 1, a servomotor control device 1B according to the second embodiment includes a motor control unit 10B as the aforementioned motor control unit 10.

Figure 4:
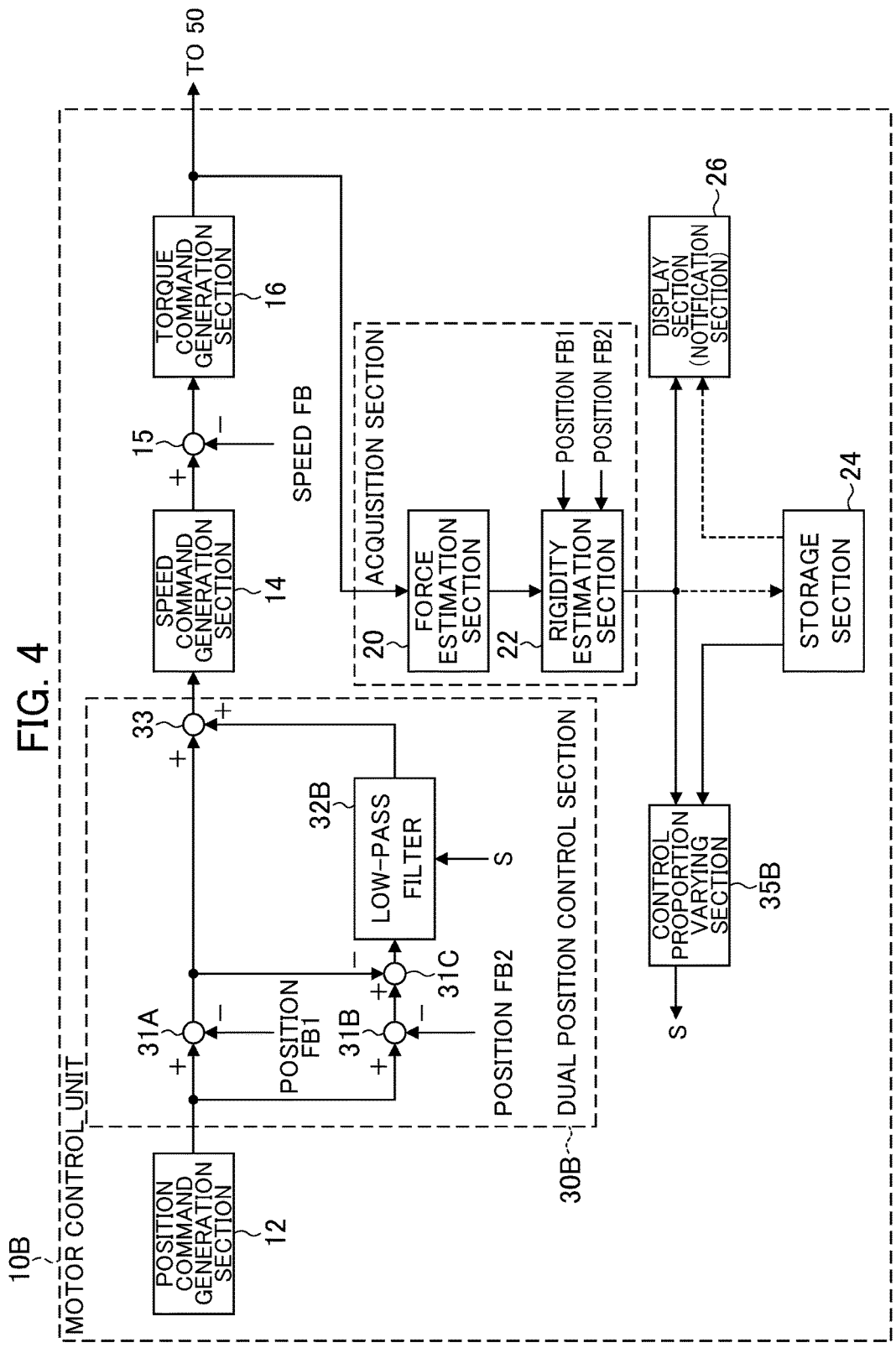
FIG. 4 is a view showing the configuration of a motor control unit in a servomotor control device according to a second embodiment.

FIG. 4 is a view showing the configuration of the motor control unit 10B in the servomotor control device 1B according to the second embodiment. As shown in FIG. 4, the motor control unit 10B differs from the first embodiment in the configuration including the dual position control section 30B and control proportion varying section 35B in place of the dual position control section 30A and control proportion varying section 35A of the motor control unit 10A shown in FIG. 2.

The dual position control section 30B differs from the first embodiment in the point of including a subtracter 31C in place of the high-pass filter 32A of the dual position control section 30A.

The subtracter (third subtraction part) 31C obtains a third deviation arrived at by subtracting the first deviation obtained by the subtracter 31A from the second deviation obtained by the subtracter 31B.

The low-pass filter 32B allows the low-frequency component of the third deviation obtained by the subtracter 31C to pass, and cuts the high-frequency component. In other words, the low-pass filter 32B allows the low-frequency component of the second deviation and the low-frequency component of the first deviation (negative value) to pass. The cut-off frequency of the low-pass filter 32B is changed in response to a control signal S from the control proportion varying section 35B.

The adder 33 adds the first deviation obtained by the subtracter 31A and the low-frequency component of the third deviation having passed through the low-pass filter 32B, and sends to the speed command generation section 14. In other words, the adder 33 adds the high-frequency component of the first deviation by addition of the first deviation and the low-frequency component (negative value) of the first deviation, with the low-frequency component of the second deviation.

The dual position control section 30B, similarly to the dual position control section 30A, also thereby performs semi-closed feedback control based on the high-frequency component of the first deviation between the position command value and position FB1 value from the encoder 40, and full-closed feedback control based on the low-frequency component of the second deviation between the position command value and position FB2 value from the scale 80.

Herein, when defining the first deviation as E1, and the second deviation as E2, the third deviation E3 and output EL of the low-pass filter 32B are expressed by the following formulas.

$$E3 = E2 - E1$$

$$EL = 1/(1+\tau s) \times E3 = 1/(1+\tau s) \times (E2 - E1)$$

The deviation added by the adder 33 is thereby expressed by the following formula.

$$\text{Deviation} = E1 + 1/(1+\tau s) \times (E2 - E1) \quad (3)$$
$$= \tau s/(1+\tau s) \times E1 + 1/(1+\tau s) \times E2$$

Formula (3) above is identical to aforementioned Formula (1). The functions and operations of the dual position control section 30B are thereby found to be identical to the functions and operations of the aforementioned dual position control section 30A also based on Formula (3) above.

The control proportion varying section 35B, similarly to the control proportion varying section 35A, varies the proportion of semi-closed feedback control to full-closed feedback control, in response to the magnitude of rigidity of the connection mechanism 60 estimated by the rigidity estimation section 22. More specifically, the control proportion varying section 35B causes the proportion of semi-closed feedback control to increase and the proportion of full-closed feedback control to decrease, in response to a decline in the estimated rigidity of the connection mechanism 60.

More specifically, the control proportion varying section 35B generates the control signal S corresponding to the magnitude of rigidity of the connection mechanism 60 estimated by the rigidity estimation section 22, based on the function (for example, a table) stored in the storage section 24, and sends to the low-pass filter 32B. The control proportion varying section 35B thereby causes the cut-off frequency of the low-pass filter 32B to vary. More specifically, the control proportion varying section 35B causes the cut-off frequency of the low-pass filter 32B to decline in response to a decline in the estimated rigidity of the connection mechanism 60.

It is also possible to obtain similar advantages to the servomotor control device 1A of the first embodiment with the servomotor control device 1B of the present embodiment.

In other words, the dual position control section 30B of the present embodiment also performs semi-closed feedback control based on the high-frequency component of the first deviation between the position command value and position FB1 value from the encoder 40, and full-closed feedback control based on the low-frequency component of the second deviation between the position command value and position FB2 value form the scale 80. The semi-closed feedback control becomes dominant during transient operation in which high-frequency deviation is generated, and the full-closed feedback control becomes dominant during positioning in which low-frequency deviation is generated. As a result thereof, it is possible to obtain stable operation during transient operation, and thus possible to suppress vibrations in the machine tool. On the other hand, during positioning, it is possible to obtain high positioning precision.

Furthermore, in the servomotor control device 1B of the present embodiment, the control proportion varying section 35B causes the cut-off frequency of the low-pass filter 32B to decline in response to a decline in the estimated rigidity of the connection mechanism 60. The proportion of full-closed feedback control based on the low-frequency component of the second deviation between the position command value and position FB2 value thereby decreases, and the proportion of semi-closed feedback control based on the high-frequency component of the first deviation between the position command value and position FB1 value increases. In other words, the proportion of full-closed feedback control including the connection mechanism 60 decreases, and the proportion of semi-closed feedback control capable of stable operation without including the connection mechanism 60 increases. It is thereby possible to suppress the occurrence of vibration in the machine tool caused by a decline in rigidity of the connection mechanism 60, without harming the high positioning precision during positioning. For this reason, it is possible to suppress a decline in the machining precision of the machine tool caused by the occurrence of vibration in the machine tool.

It should be noted that, also in the present embodiment, the control proportion varying section 35B may obtain the variation (amount of decline) in rigidity of the connection mechanism 60 based on a plurality of magnitudes of rigidity estimated at every predetermined time interval or indefinite time interval stored in the storage section 24, and vary the proportion of semi-closed feedback control to full-closed feedback control in response to the obtained variation (amount of decline) in rigidity of the connection mechanism 60.

(Modified Example of Second Embodiment)

Figure 5:
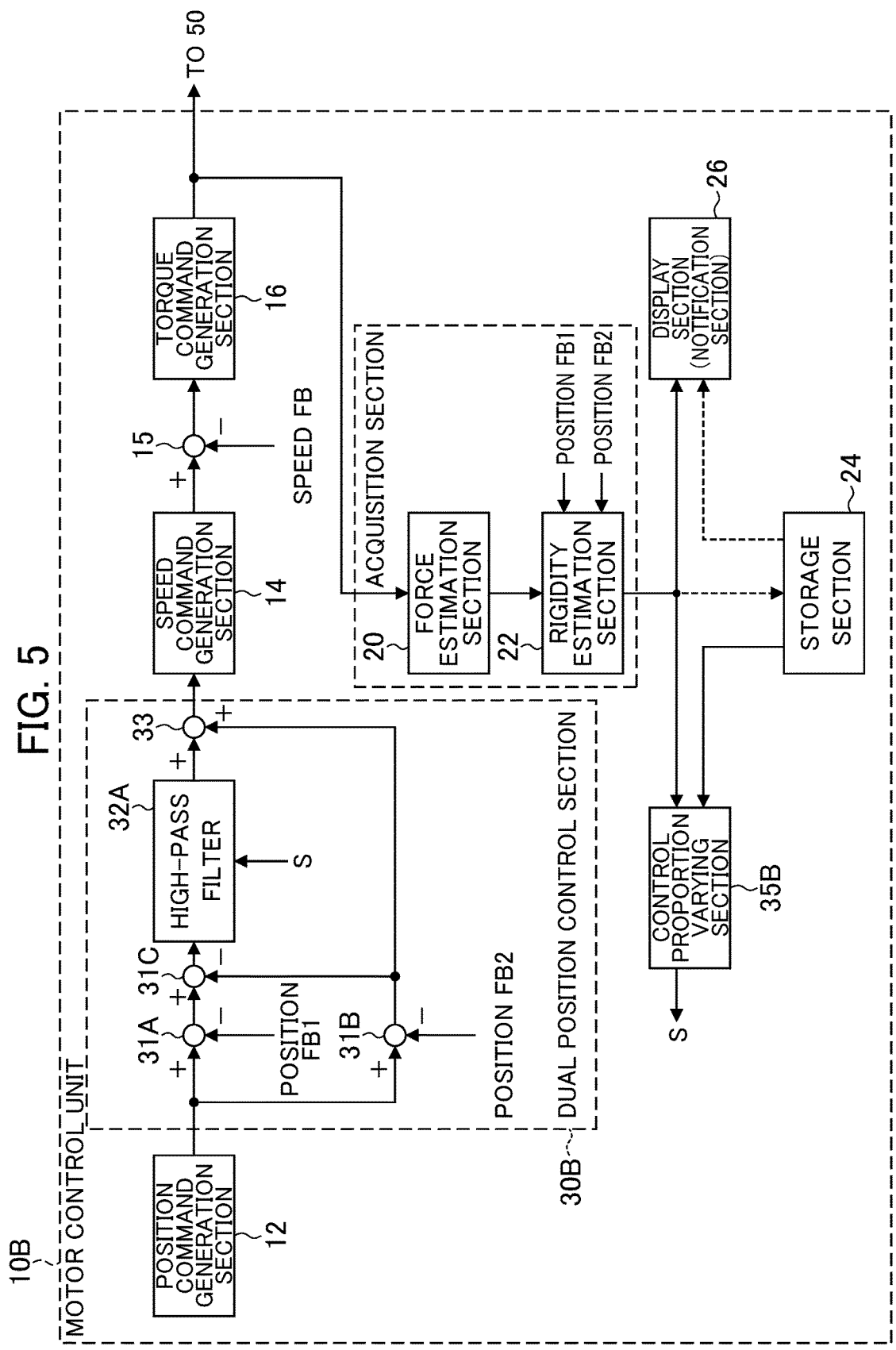
FIG. 5 is a view showing the configuration of a motor control unit in a servomotor control device according to a modified example of the second embodiment.

FIG. 5 is a view showing the configuration of the motor control unit 10B of a servomotor control device 1B according to a modified example of the second embodiment. As shown in FIG. 5, the dual position control section 30B may include the subtracter 31C and the high-pass filter 32A, in place of the subtracter 31C and low-pass filter 32B.

The subtracter (third subtraction part) 31C obtains a third deviation arrived at by subtracting the second deviation obtained by the subtracter 31B from the first deviation obtained by the subtracter 31A.

The high-pass filter 32A allows the high-frequency component of the third deviation obtained by the subtracter 31C to pass, and cuts the low-frequency component. In other words, the high-pass filter 32A allows the high-frequency component of the first deviation and high-frequency component of the second deviation (negative value) to pass. The cut-off frequency of the high-pass filter 32A is changed in response to the control signal S from the control proportion varying section 35B.

The adder 33 adds the high-frequency component of the third deviation having passed through the high-pass filter 32A, and the second deviation obtained by the subtracter 31A, and sends to the speed command generation section 14. In other words, the adder 33 adds the high-frequency component of the first deviation, and the low-frequency component of the second deviation from addition of the second deviation and the high-frequency component (negative value) of the second deviation.

The dual position control section 30B of the modified example, similarly to the dual position control section 30B of the second embodiment, also thereby performs semi-closed feedback control based on the high-frequency component of the first deviation between the position command value and the position FB1 value from the encoder 40, and full-closed feedback control based on the low-frequency component of the second deviation between the position command value and the position FB2 value from the scale 80.

Herein, when defining the first deviation as E1, and the second deviation as E2, the third deviation E3 and output EH of the high-pass filter 32A are expressed by the following formulas.

$$E3=E1-E2$$

$$EH=\tau s/(1+\tau s) \times E3 = \tau s/(1+\tau s) \times (E1-E2)$$

The deviation added by the adder 33 is thereby expressed by the following formula.

$$\text{Deviation} = \tau s/(1+\tau s) \times (E1 - E2) + E2 \quad (4)$$
$$= \tau s/(1+\tau s) \times E1 + 1/(1+\tau s) \times E2$$

Formula (4) above is identical to aforementioned Formula (3). The functions and operations of the dual position control section 30B of the modified example are thereby found to be identical to the functions and operations of the dual position control section 30B of the second embodiment also based on Formula (4) above.

The control proportion varying section 35B, similarly to the second embodiment, changes the proportion of semi-closed feedback control to full-closed feedback control, in response to the magnitude of rigidity of the connection mechanism 60 estimated by the rigidity estimation section 22. More specifically, the control proportion varying section 35B causes the proportion of semi-closed feedback control to increase and the proportion of full-closed feedback control to decrease, in response to a decline in the estimated rigidity of the connection mechanism 60.

More specifically, the control proportion varying section 35B generates the control signal S corresponding to the magnitude of rigidity of the connection mechanism 60 estimated by the rigidity estimation section 22, based on a function (for example, table) stored in the storage section 24, sends to the high-pass filter 32A. The control proportion varying section 35B thereby causes the cut-off frequency of the high-pass filter 32A to vary. More specifically, the control proportion varying section 35B causes the cut-off frequency of the high-pass filter 32A to decline in response to a decline in the estimated rigidity of the connection mechanism 60.

The servomotor control device 1B of this modified example can also obtain similar advantages as the servomotor control device 1B of the second embodiment.

(Servomotor Control Device of Third Embodiment)

In the first embodiment, the proportion of semi-closed feedback control to full-closed feedback control is varied in response to the magnitude of rigidity of the connection mechanism 60. In the third embodiment, the proportion of semi-closed feedback control to full-closed feedback control is changed based on the magnitude of resonance frequency of the servomotor control device.

In FIG. 1, the servomotor control device 1C according to the third embodiment includes the motor control unit 10C as the aforementioned motor control unit 10.

Figure 6:
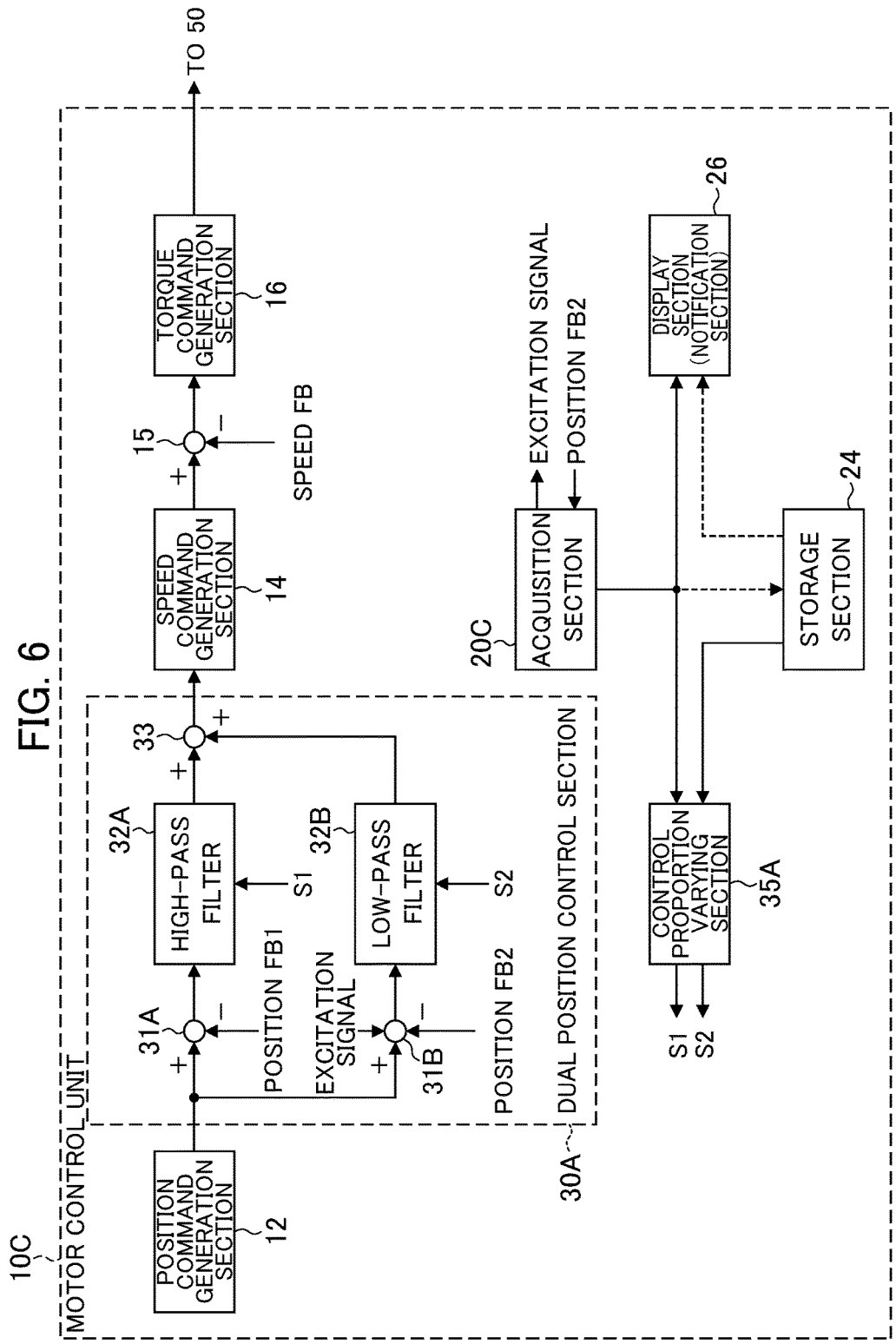
FIG. 6 is a view showing the configuration of a motor control unit in a servomotor control device according to a third embodiment.

FIG. 6 is a view showing the configuration of the motor control unit 10C in the servomotor control device 1C according to the third embodiment. As shown in FIG. 6, the motor control unit 10C differs from the first embodiment in the configuration including an acquisition section 20C in place of the force estimation section 20 (acquisition section) and rigidity estimation section (acquisition section) 22 of the motor control unit 10A shown in FIG. 2.

The acquisition section 20C acquires the frequency characteristics for transfer characteristics of the servomotor control device 1C. For example, the acquisition section 20C acquires the frequency characteristics of gain/phase of the full-closed feedback control loop from the subtracter 31B until the scale 80. More specifically, the acquisition section 20C inputs an excitation signal (for example, signal including plurality of frequency components such as sine-wave sweep signal and M-sequence signal) to the subtracter 31B, and acquires the frequency characteristics of the gain/phase of the full-closed feedback control loop by measuring the position FB2 signal fed back from the scale 80 to the subtracter 31B. At this time, the entire feedback loop is placed into an open loop state.

Then, the acquisition section 20C obtains the magnitude of resonance frequency of the servomotor control device 1C (i.e. machine tool), from the acquired frequency characteristics of the gain/phase.

The storage section 24 stores the magnitude of resonance frequency of the servomotor control device 1C acquired by the acquisition section 20C, at every predetermined time interval or indefinite time intervals. In addition, the storage section 24 stores a function defining as input the magnitude of resonance frequency of the servomotor control device 1C, and defining as outputs the control signals in S1, S2 according to the inputted magnitude of resonance frequency, which change the cut-off frequency of the high-pass filter 32A and the cut-off frequency of the low-pass filter 32B. For example, the storage section 24 stores a table in which the magnitudes of resonance frequency and control signals S1, S2 are associated as a function. For example, in the table, the control signals S1, S2 are set such that lower the cut-off frequencies as the resonance frequency declines.

The control proportion varying section 35A varies the proportion of semi-closed feedback control to full-closed feedback control in the dual position control section 30A, in response to the magnitude of resonance frequency of the servomotor control device 1C acquired by the acquisition section 20C. More specifically, the control proportion varying section 35A causes the proportion of semi-closed feedback control to increase, and the proportion of full-closed feedback control to decrease, in response to a decline in the acquired resonance frequency of the servomotor control device 1C More specifically, the control proportion varying section 35A generates control signals S1, S2 corresponding to the magnitude of resonance frequency of the servomotor control device 1C acquired by the acquisition section 20C, based on the function (for example, table) stored in the storage section 24, and sends to the high-pass filter 32A and low-pass filter 32B, respectively. The control proportion varying section 35A thereby causes the cut-off frequencies of the high-pass filter 32A and low-pass filter 32B to vary. More specifically, the control proportion varying section 35A causes the cut-off frequencies of the high-pass filter 32A and low-pass filter 32B to decline in response to a decline in the estimated resonance frequency of the servomotor control device 1C.

Figure 7:
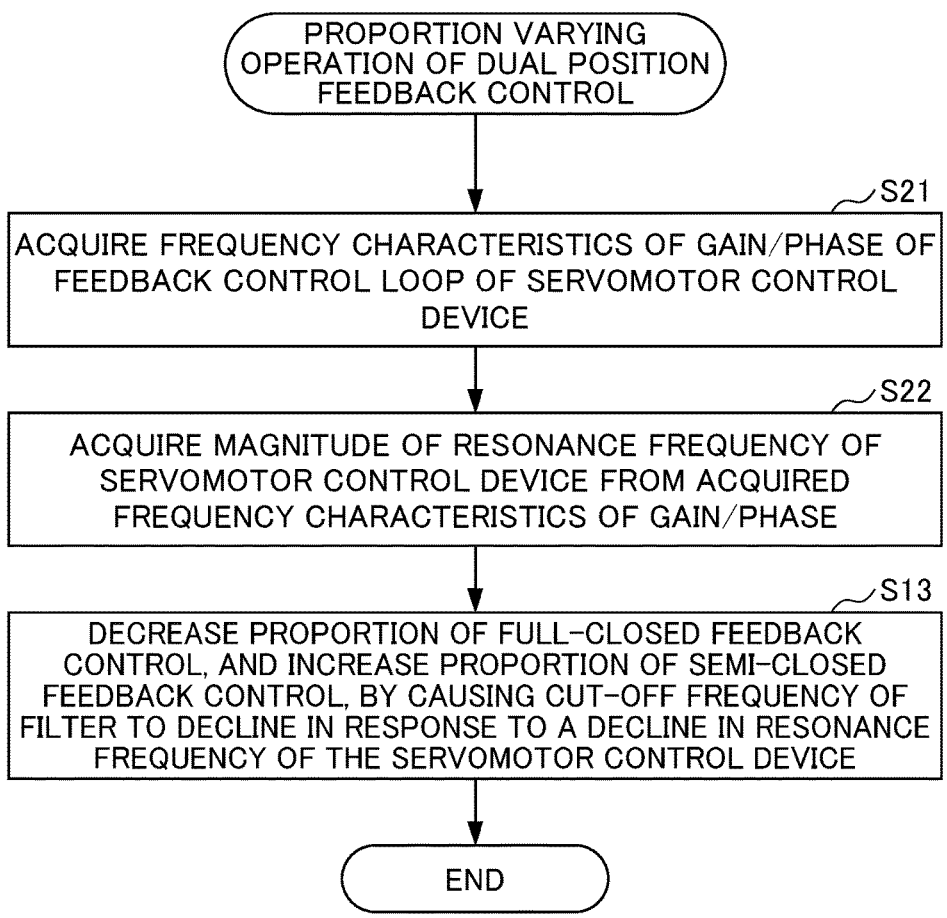
FIG. 7 is a flowchart showing a proportion varying operation of dual position feedback control by the servomotor control device according to the third embodiment.

Next, the proportion varying operation of dual position feedback control by the servomotor control device 1C of the third embodiment will be explained by referencing FIG. 7. FIG. 7 is a flowchart showing the proportion varying operation of the dual position feedback control by the servomotor control device 1C of the third embodiment.

First, in Step S21, the acquisition section 20C acquires the frequency characteristics of gain/phase of the full-closed feedback control loop from the subtracter 31B until the scale 80 in the servomotor control device 1C. More specifically, the acquisition section 20C inputs the excitation signal to the subtracter 31B, and acquires the frequency characteristics of gain/phase of the full-closed feedback control loop by measuring the position FB2 signal fed back from the scale 80 to the subtracter 31B.

Next, in Step S22, the acquisition section 20C obtains the magnitude of resonance frequency of the servomotor control device 1C (i.e. machine tool) from the acquired frequency characteristics of gain/phase.

Figure 8:
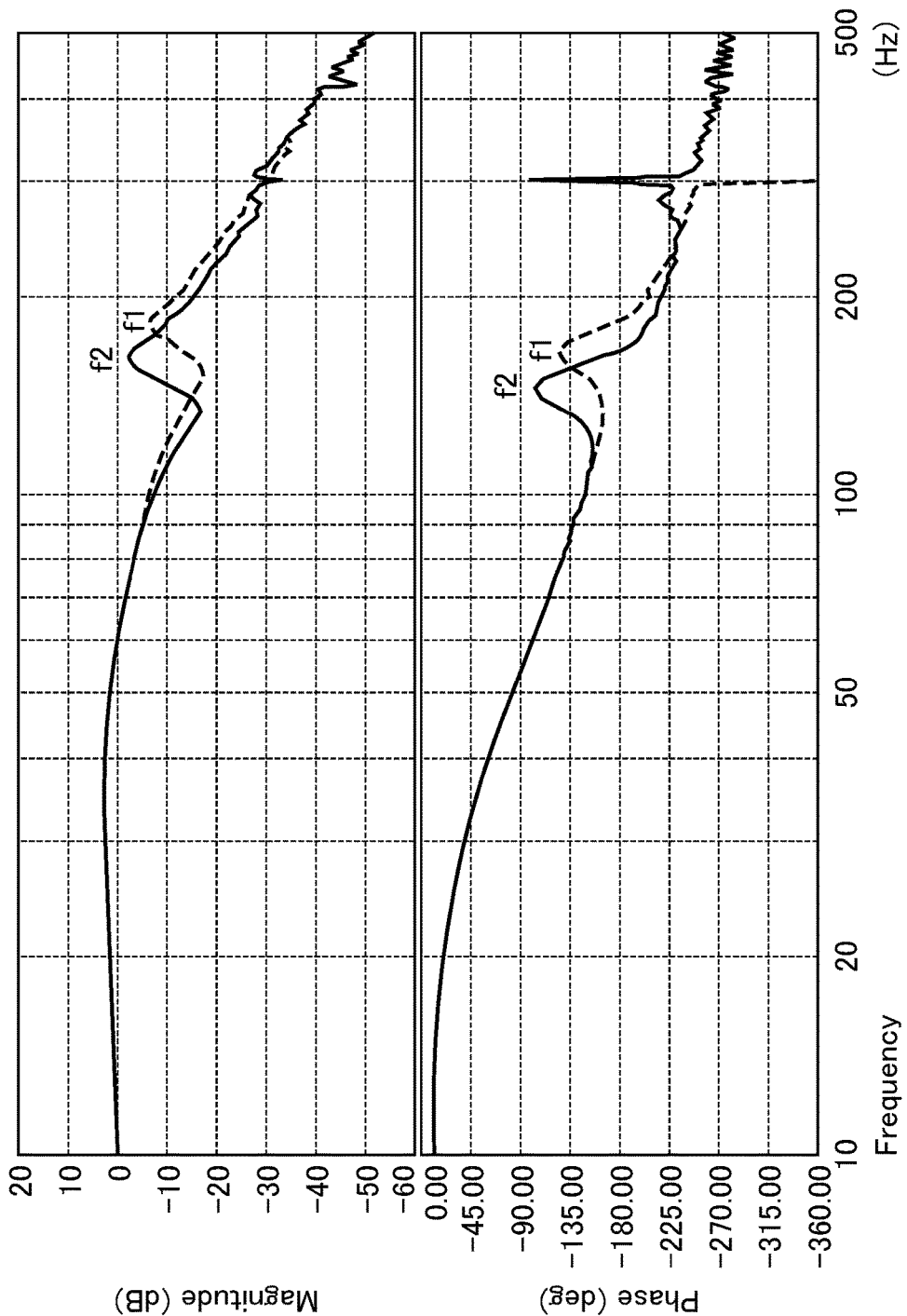
FIG. 8 is a view showing one example of frequency characteristics of gain/phase of feedback control loop of the servomotor control device.

FIG. 8 shows an example of the frequency characteristics of gain (magnitude)/phase (phase) of the feedback control loop of the servomotor control device. As shown in FIG. 8, when the rigidity of the connection mechanism ages (declines, deteriorates), the resonance frequency of the servomotor control device 1C (i.e. machine tool) declines from f1 (dotted line) to f2 (solid line). In addition, the resonance frequency of the servomotor control device 1C may decline from f1 (dotted line) to f2 (solid line) due to the cause of aging degradation of any other components of the machine tool. When the resonance frequency of the servomotor control device 1C declines, the probability of low-frequency vibrations being produced in the machine tool rises. When low-frequency vibrations occur in the machine tool, the machining precision of the machine tool declines.

Therefore, similarly to as mentioned above, in Step S13, the control proportion varying section 35A generates control signals S1, S2 corresponding to the magnitude of resonance frequency of the servomotor control device 1C acquired by the acquisition section 20C, based on the function (for example, table) stored in the storage section 24, and sends to the high-pass filter 32A and low-pass filter 32B of the dual position control section 30A, respectively. The control proportion varying section 35A thereby causes the cut-off frequencies of the high-pass filter 32A and low-pass filter 32B to vary. More specifically, the control proportion varying section 35A causes the cut-off frequencies of the high-pass filter 32A and low-pass filter 32B to decline in response to a decline in the acquired resonance frequency of the servomotor control device 1C.

The proportion of the low frequency component of the second deviation between the position command value and position FB2 value passing through the low-pass filter 32B thereby decreases, and the proportion of the high frequency component of the first deviation between the position command value and position FB1 value passing through the high-pass filter 32A increases. For this reason, the proportion of full-closed feedback control based on the low frequency component of the second deviation decreases, and the proportion of semi-closed feedback control based on the high frequency component of the first deviation increases.

At this time, the display section 26 may display information indicating the magnitude of resonance frequency of the servomotor control device 1C.

The motor control unit 10C returns to Step S21 after a predetermined time elapse, and repeats the aforementioned operations. It should be noted that the motor control unit 10C is not limited to after a fixed time (predetermined time) elapse set in advance, and may repeat the aforementioned operations after an irregular time elapse (at indefinite time intervals). Alternatively, the motor control unit 10C may repeat the aforementioned operations at all times, or during set specific operations (for example, during startup).

It should be noted that, in Step S22, the acquisition section 20C may store the acquired magnitude of resonance frequency in the storage section 24 to be associated with various information such as the acquisition time/date. In addition, in Step S13, the control proportion varying section 35A may vary the proportion of controls based on the latest magnitude of resonance frequency stored in the storage section 24.

In addition, the resonance frequency of the servomotor control device 1C (i.e. machine tool) varies depending on the position of the table 70 relative to the connection mechanism 60, weight of the loaded object on the table 70, etc. Therefore, the acquisition section 20C may perform measurement of frequency characteristics of gain/phase of the control loop, at the same conditions as the mode of use such as the weight of the loaded object on the table 70. In addition, the control proportion varying section 35A may adjust the variation of cut-off frequencies of the high-pass filter 32A and low-pass filter 32B, by taking consideration of various information such as the position of the table 70 relative to the connection mechanism 60.

As explained above, with the servomotor control device 1C of the present embodiment, the acquisition section 20C acquires the magnitude of resonance frequency of the servomotor control device 1C, and the control proportion varying section 35A causes the cut-off frequency of the high-pass filter 32A and the cut-off frequency of the low-pass filter 32B of the dual position control section 30A to decline in response to a decline in the acquired resonance frequency of the servomotor control device 1C. The proportion of full-closed feedback control based on the low-frequency component of the second deviation between the position command value and the position FB2 value thereby decreases, and the proportion of semi-closed feedback control based on the high-frequency component of the first deviation between the position command value and the position FB1 value increases. In other words, the proportion of full-closed feedback control including the connection mechanism 60 decreases, and the proportion of semi-closed feedback control capable of stable operation without including the connection mechanism 60 increases. It is thereby possible to suppress the occurrence of vibration in the machine tool caused by a decline in resonance frequency of the servomotor control device 1C, without harming the high positioning precision during positioning. For this reason, it is possible to suppress a decline in the machining precision of the machine tool caused by the occurrence of vibration in the machine tool.

In addition, with the servomotor control device 1C of the present embodiment, the display section 26 displays information related to the magnitude of resonance frequency of the servomotor control device 1C (i.e. machine tool); therefore, it is possible for the user to confirm the aging of the machine tool (for example, aging degradation in rigidity of the connection mechanism 60). In addition, the user can confirm the existence of the necessity for maintenance of the machine tool (for example, connection mechanism 60).

It should be noted that, in the present embodiment, the control proportion varying section 35A varies the proportion of semi-closed feedback control to full-closed feedback control in response to the magnitude of resonance frequency of the servomotor control device 1C; however, it is not limited thereto. For example, the control proportion varying section 35A may obtain the variation (amount of decline) in the resonance frequency of the servomotor control device 1C based on a plurality of magnitudes of resonance frequency acquired at every predetermined time interval or indefinite time intervals stored in the storage section 24, and vary the proportion of semi-closed feedback control to full-closed feedback control in response to the obtained variation (amount of decline) in resonance frequency of the servomotor control device 1C.

In addition, the display section 26 may display information indicating the obtained variation (amount of decline) in the resonance frequency of the servomotor control device 1C.

In addition, in the present embodiment, the acquisition section 20C may obtain the magnitude of resonance frequency of the servomotor control device 1C (i.e. machine tool), by measuring the frequency characteristics of gain/phase of the semi-closed feedback control loop from the subtracter 31A until the encoder 40. In addition, the acquisition section 20C may obtain the magnitude of resonance frequency of the servomotor control device 1C (i.e. machine tool), by measuring the frequency characteristics of gain/phase of the speed control loop from the subtracter 15 until the encoder 40.

It should be noted that the present embodiment explains a case of the resonance frequency of the servomotor control device 1C (i.e. machine tool) declining due to aging degradation of the machine tool. However, the resonance frequency of the servomotor control device 1C (i.e. machine tool) increasing due to any cause such as aging of the machine tool can also be considered. In this case, the control proportion varying section 35A may raise the cut-off frequency of the high-pass filter 32A and the cut-off frequency of the low-pass filter 32B of the dual position control section 30A, in response to an increase in the acquired resonance frequency of the servomotor control device 1C.

Although embodiments of the present invention have been explained above, the present invention is not to be limited to the aforementioned embodiments. In addition, the effects described in the present embodiment are merely exemplifying the most preferred effects produced from the present invention, and the effects according to the present invention are not limited to those described in the present embodiment.

For example, the aforementioned embodiments may be modified as appropriate, or may be realized by replacing and combining. For example, the force estimation section (acquisition section) 20 and rigidity estimation section (acquisition section) 22 of the first embodiment and second embodiment, and the acquisition section 20C of the third embodiment maybe substituted as appropriate, and the dual position control section 30A and control proportion varying section 35A of the first embodiment and third embodiment, and the dual position control section 30B and control proportion varying section 35B of the second embodiment may be substituted as appropriate.

In addition, the aforementioned embodiments exemplify the dual position control sections 30A, 30B made using the high-pass filter 32A and/or low-pass filter 32B. However, the dual position control sections 30A, 30B may use a bandpass filter and/or notch filter (band-stop filter) or the like in place of the high-pass filter 32A and/or low-pass filter 32B. In this case, the control proportion varying sections 35A, 35B vary the center frequency of each filter in response to the magnitude of rigidity of the connection mechanism 60.

In addition, the aforementioned embodiment stores a plurality of magnitudes of rigidity or a plurality of magnitudes of resonance frequency acquired at every predetermined time interval or indefinite time intervals in the storage section 24 of its own device; however, they may be stored in the storage unit of an external server device connected via a network.

In addition, in the aforementioned embodiments, a display section is exemplified as an example of a notification section; however, the notification section is not limited thereto. For example, the notification section may be a light emitting part such as one or a plurality of LEDs. In the case of being one LED, different information may be notified by way of illuminating, flashing, and the like. In addition, in the case of being a plurality of LEDs, different information may be notified by way of the number illuminated of the same color, or different colors. In addition, for example, the notification section may be a sound generating unit such as for a buzzer sound or voice.

EXPLANATION OF REFERENCE NUMERALS 1, 1A, 1B, 1C servomotor control device
10, 10A, 10B, 10C motor control unit
12 position command generation section
14 speed command generation section
15 subtracter
16 torque command generation section
20 force estimation section (acquisition section)
22 rigidity estimation section (acquisition section)
20C acquisition section
24 storage section
26 display section (notification section)
30A, 30B dual position control section
31A subtracter (first subtraction part)
31B subtracter (second subtraction part)
31C subtracter (third subtraction part)
32A high-pass filter
32B low-pass filter
33 adder (addition part)
35A, 35B control proportion varying section (varying section)
40 encoder (first position detection section)
50 servomotor
60 connection mechanism
61 coupling
62 ball screw
63 nut
70 table (driven body)
80 scale (second position detection section)

What is claimed is:

1. A servomotor control device, comprising:
a servomotor;
a driven body that is driven by the servomotor;
a connection mechanism that connects the servomotor and the driven body to transmit power of the servomotor to the driven body;
a first position detection section that detects a position of the servomotor;
a second position detection section that detects a position of the driven body; and
a motor control unit that controls the servomotor,
wherein the motor control unit includes:
a dual position control section that performs semi-closed feedback control based on a high-frequency component of a first deviation between a position command value for driving control of the servomotor and the position of the servomotor detected by the first position detection section, and full-closed feedback control based on a low-frequency component of a second deviation between the position command value and the position of the driven body detected by the second position detection section;
an acquisition section that acquires a magnitude of rigidity of the connection mechanism, or a magnitude of resonance frequency of the servomotor control device; and
a varying section that causes a proportion of the semi-closed feedback control to the full-closed feedback control in the dual position control section to vary in response to the magnitude of or variation in rigidity of the connection mechanism acquired by the acquisition section, or the magnitude of or variation in resonance frequency of the servomotor control device acquired by the acquisition section.

2. The servomotor control device according to claim 1, wherein the varying section causes a proportion of the semi-closed feedback control to increase and a proportion of the full-closed feedback control to decrease, in response to a decline in the rigidity of the connection mechanism, or a decline in the resonance frequency of the servomotor control device.

3. The servomotor control device according to claim 1, wherein the acquisition section includes:

a force estimation section that estimates a drive force acting on the driven body at a connection part between the connection mechanism and the driven body; and a rigidity estimation section that estimates a magnitude of rigidity of the connection mechanism, based on the position of the servomotor detected by the first position detection section, the position of the driven body detected by the second position detection section, and the drive force estimated by the force estimation section.

4. The servomotor control device according to claim 1, wherein the acquisition section acquires a frequency characteristic of a transfer characteristic of a feedback control loop of the servomotor control device, and acquires a magnitude of resonance frequency of the servomotor control device from the frequency characteristic of the transfer characteristic thus acquired.

5. The servomotor control device according to claim 1, wherein the motor control unit further includes a storage section that stores a plurality of magnitudes of rigidity, or a plurality of magnitudes of resonance frequency, acquired by the acquisition section at every predetermined time interval or indefinite time intervals, and
wherein the varying section calculates variation in the rigidity of the connection mechanism or variation in the resonance frequency of the servomotor control device, based on a plurality of magnitudes of rigidity or a plurality of magnitudes of resonance frequency stored in the storage section.

6. The servomotor control device according to claim 1, wherein the dual position control section further includes:
a first subtraction part that obtains a first deviation between the position command value and the position of the servomotor detected by the first position detection section;
a second subtraction part that obtains a second deviation between the position command value and the position of the driven body detected by the second position detection section;
a high-pass filter that inputs the first deviation from the first subtraction part;
a low-pass filter that inputs the second deviation from the second subtraction part; and
an addition part that adds a high-frequency component of the first deviation outputted from the high-pass filter and a low-frequency component of the second deviation outputted from the low-pass filter, and
wherein the varying section causes the cut-off frequency of the high-pass filter and the cut-off frequency of the low-pass filter to vary in response to the magnitude of or variation in rigidity of the connection mechanism, or the magnitude of or variation in resonance frequency of the servomotor control device.

7. The servomotor control device according to claim 6, wherein the varying section causes the cut-off frequency of the high-pass filter and cut-off frequency of the low-pass filter to decline, in response to a decline in the rigidity of the connection mechanism, or a decline in the resonance frequency of the servomotor control device.

8. The servomotor control device according to claim 6, wherein the varying section sets the cut-off frequency of the high-pass filter and the cut-off frequency of the low-pass filter to be the same.

9. The servomotor control device according to claim 1, wherein the dual position control section further includes:

a first subtraction part that obtains a first deviation between the position command value and the position of the servomotor detected by the first position detection section;
a second subtraction part that obtains a second deviation between the position command value and the position of the driven body detected by the second position detection section;
a third subtraction part that obtains a third deviation arrived at by subtracting the first deviation of the first subtraction part from the second deviation of the second subtraction part;
a low-pass filter that inputs the third deviation from the third subtraction part; and
an addition part that adds a high-frequency component of the first deviation and a low-frequency component of the second deviation, by adding the first deviation from the first subtraction part and a low-frequency component of the third deviation outputted from the low-pass filter, and
wherein the varying section causes the cut-off frequency of the low-pass filter to vary in response to the magnitude of or variation in rigidity of the connection mechanism, or the magnitude of or variation in resonance frequency of the servomotor control device.

10. The servomotor control device according to claim 9, wherein the varying section causes the cut-off frequency of the low-pass filter to decline in response to a decline in the rigidity of the connection mechanism, or a decline in the resonance frequency of the servomotor control device.

11. The servomotor control device according to claim 1, wherein the dual position control section further includes:
a first subtraction part that obtains a first deviation between the position command value and the position of the servomotor detected by the first position detection section;
a second subtraction part that obtains a second deviation between the position command value and the position of the driven body detected by the second position detection section;
a third subtraction part that obtains a third deviation arrived at by subtracting the second deviation of the second subtraction part from the first deviation of the first subtraction part;
a high-pass filter that inputs the third deviation from the third subtraction part; and
an addition part that adds a high-frequency component of the first deviation and a low-frequency component of the second deviation, by adding the a high-frequency component of the third deviation outputted from the high-pass filter and the second deviation from the second subtraction part, and
wherein the varying section causes the cut-off frequency of the high-pass filter to vary in response to the magnitude of or variation in rigidity of the connection mechanism, or the magnitude of or variation in resonance frequency of the servomotor control device.

12. The servomotor control device according to claim 11, wherein the varying section causes the cut-off frequency of the high-pass filter to decline in response to a decline in the rigidity of the connection mechanism, or a decline in the resonance frequency of the servomotor control device.

* * * * *